US007711751B2

(12) United States Patent
Kelley et al.

(10) Patent No.: US 7,711,751 B2
(45) Date of Patent: May 4, 2010

(54) REAL-TIME NETWORK PERFORMANCE MONITORING SYSTEM AND RELATED METHODS

(75) Inventors: Bruce Kelley, Westford, MA (US); Anil Singhal, Carlisle, MA (US); Ashwani Singhal, Andover, MA (US); Rajeev Nadkarni, North Chelmsford, MA (US); Bruce Sweet, North Reading, MA (US)

(73) Assignee: Netscout Systems, Inc., Westford, MA (US)

( * ) Notice: Subject to any disclaimer, the term of this patent is extended or adjusted under 35 U.S.C. 154(b) by 1478 days.

(21) Appl. No.: 10/462,220

(22) Filed: Jun. 13, 2003

(65) Prior Publication Data

US 2004/0054680 A1 Mar. 18, 2004

Related U.S. Application Data (60) Provisional application No. 60/388,667, filed on Jun. 13, 2002.

(51) Int. Cl.
*G06F 17/00* (2006.01)
(52) U.S. Cl. .................. 707/791; 707/922; 709/224
(58) Field of Classification Search .................. 707/10, 707/100; 370/253
See application file for complete search history.

(56) References Cited

U.S. PATENT DOCUMENTS

| 5,459,837 | A | 10/1995 | Caccavale | 395/200 |
|---|---|---|---|---|
| 5,878,420 | A * | 3/1999 | de la Salle | 707/10 |
| 6,085,243 | A | 7/2000 | Fletcher et al. | 709/224 |
| 6,278,694 | B1 * | 8/2001 | Wolf et al. | 370/253 |
| 6,279,037 | B1 * | 8/2001 | Tams et al. | 709/224 |
| 6,327,620 | B1 * | 12/2001 | Tams et al. | 709/224 |
| 6,366,934 | B1 | 4/2002 | Cheng et al. | 707/513 |
| 6,493,756 | B1 | 12/2002 | O'Brien et al. | 709/224 |
| 6,516,322 | B1 | 2/2003 | Meredith | 707/102 |
| 6,519,714 | B1 * | 2/2003 | Sweet et al. | 714/28 |
| 6,615,261 | B1 * | 9/2003 | Smørgrav | 709/224 |
| 6,836,800 | B1 * | 12/2004 | Sweet et al. | 709/224 |
| 7,111,204 | B1 * | 9/2006 | Couturier et al. | 714/39 |
| 2002/0010700 | A1 | 1/2002 | Wotring et al. | 707/100 |
| 2003/0115266 | A1 * | 6/2003 | Sweet et al. | 709/203 |
| 2003/0198235 | A1 * | 10/2003 | Weldon et al. | 370/401 |
| 2004/0139194 | A1 * | 7/2004 | Naganathan | 709/224 |

OTHER PUBLICATIONS

International Search Report for International Application No. PCT/US03/18681 dated Oct. 10, 2003 (4 pgs.).

* cited by examiner

*Primary Examiner*—John R. Cottingham
*Assistant Examiner*—Michael Pham
(74) *Attorney, Agent, or Firm*—Finnegan Henderson Farabow Garrett & Dunner LLP (57) ABSTRACT

Network performance data is collected, recorded, and normalized. In one embodiment, a set of first performance data collected by an agent in response to network transactions initiated by the agent and a second set of performance data resulting from passively monitoring traffic on the network are received. The first and second sets of performance data are normalized to create a set of constantly formatted network performance data capable of convenient analysis.

31 Claims, 7 Drawing Sheets

REAL-TIME NETWORK PERFORMANCE MONITORING SYSTEM AND RELATED METHODS

CROSS-REFERENCE TO RELATED APPLICATIONS

This application claims priority to U.S. provisional patent application Ser. No. 60/388,667, filed Jun. 13, 2002.

FIELD OF THE INVENTION

The invention relates generally to data collection and more specifically to network performance data collection, monitoring, and normalization.

BACKGROUND OF THE INVENTION

Information Technology professionals are faced with unprecedented challenges caused by complex network infrastructures demanding high availability and performance. Tools for managing networks are increasingly important as infrastructures become more complex, organizations are exposed to higher risk and visibility, and business dynamics demand around-the-clock network availability.

Network devices such as routers and switches collect network performance data in the form of "management information bases" (MIBs). These MIBs often vary from vendor to vendor, although there are a few standard MIBs. In general, however, network performance metrics are gathered using varying techniques and in different formats. It can be difficult to utilize such disparate data to effectively diagnose network performance problems. Accordingly, there exists a need for a real-time network monitoring system that collects and normalizes network performance data from a variety of separate sources to facilitate unified management of the network.

SUMMARY OF THE INVENTION

In one aspect, the invention relates to a method of collecting, recording, and normalizing network performance information. The method includes the steps of receiving from an agent a first set of performance data collected by the agent in response to network transactions initiated by the agent, receiving a second set of performance data which results from passively monitoring network traffic, and normalizing the first and second sets of performance data to create a set of normalized network performance data having a single format. The first set of performance data may be received directly from an adapter, or indirectly from an agent via a probe. The first set of performance data can, for example, include data related to a response time of a network resource and data related to the availability of the network resource. The method may be performed by a probe, which may reside at a network interface. The network interface may reside at a network interface point. The network interface point may be a router or a switch. The normalized network performance data may be stored on a server. In some embodiments, the normalized network performance data stored on the server may be stored in a schema according to a common data model.

In another aspect, the invention is directed to a system for collecting, recording, and normalizing network performance information. The system generally includes at least one agent, which is operably connected to a computer network and generates a first set of network performance data. The system also includes a probe which is in communication with the agent. The probe comprises a monitor and a normalizer. The agent generates a first set of performance data and forwards it to the probe. The monitor of the probe passively monitors the network traffic to collect a second set of performance data. The normalizer normalizes the first set of performance data and the second set of performance data to generate a set of network performance data. The system may also include a server in communication with the at least one device. The at least one device may be a probe. The server may receive and store the normalized network performance data in a schema according to a common data model. The probe may further comprise an adapter for adapting data received from a plurality of network devices into a single format.

In another aspect, the invention is directed to a memory that includes network performance data stored according to a common data model. The network performance data includes a first set of performance data collected by monitoring synthetic network transactions and second set of performance data collected by passively monitoring a computer network.

In another aspect, the invention is directed to a method of actively generating and passively collecting data on a network. The method, in one embodiment, comprises generating a synthetic network transaction by a probe that is in communication with the network, and collecting data related to the synthetic network transaction. Preferably, the probe also passively collects performance data related to network transactions, and normalizes the synthetic transaction data and the passive network transaction data to generate a set of normalized network transaction data. The collection of data relating to the synthetic network transaction may be related to the response time of a network resource. The collection of data relating to the synthetic network transaction may be related to the availability of a network resource. The normalized network transaction data may be stored on a server in a schema according to a common data model.

In yet another aspect, the invention is directed to a network performance data collection device. The device, in one embodiment, includes a probe, which has at least one network interface card. The probe also includes a monitor, an extractor, a normalizer, and an agent. The monitor passively monitors network traffic received via the network interface card. The extractor extracts a first set of network performance data related to at least one management information base. The agent actively generates synthetic network transactions and extracts a second set of network performance data related to the at least one management information base. The normalizer normalizes the first and second sets of network performance data, and may store the normalized performance data in a storage device. The storage device may further store the normalized performance data in a schema according to a common data model.

In yet another aspect, the invention is directed to a method of collecting data on a network. The method, in one embodiment, includes the steps of capturing passive data by a probe that is in communication with the network, and receiving a first indicator from an agent in communication with the probe that a synthetic transaction is beginning. The method also includes the steps of capturing data related to the synthetic transaction, and receiving a second indicator from the agent that the synthetic transaction is ending. The captured passive data and the captured data related to the synthetic transaction may be normalized to generate a set of normalized network transaction data, which may in turn be stored on a server in a schema according to a common data model.

In another aspect the invention is directed to a method of monitoring the performance of a computer network. The method, in one embodiment, includes the steps of receiving network performance information from at least one management information base, incorporating the received data into a common data model, and storing the common data model for access by a software application.

In another aspect, the invention is directed to a method of monitoring the performance of a computer network. The method, in one embodiment, involves receiving network performance information from a plurality of interfaces, normalizing the network performance information to conform to a common data model, aggregating the network performance information from at least two of the interfaces, and providing access to the aggregated network performance information. In some embodiments, the aggregated performance information conforms to the common data model.

In another aspect the invention is directed to a method of monitoring the performance of a computer network. The method, in one embodiment, includes the steps of receiving network performance information at a plurality of source probes, each of which receives network performance information from a plurality of management information bases, transmitting the network performance data received at each source probe to a single destination probe, incorporating the network performance data received at the single destination probe into a common data model, and aggregating the transmitted data at the destination probe into a single data structure. The single data structure may be stored on a server in a schema according to a common data model.

In another aspect the invention is directed to a system for collecting, recording, and normalizing network performance information. The system, in one embodiment, comprises plurality of source probes and a destination probe. The source probes are operably connected to a computer, and collect a first set of performance data from a computer network. The destination probes are in communication with the source probes, and comprise a receiver and an aggregation module. The receiver receives performance data from the source probes, and the aggregation module aggregates the performance data into a set of normalized network performance data having a single format. The system may also include a storage device for storing the normalized network performance data. The storage device may store the normalized network performance data in a scheme according to a common data model.

In another aspect the invention is directed to a method of associating network performance data with an alarm in a computer network. The method, in one embodiment, comprises the steps of receiving network performance data, buffering at least a portion of the network performance data in a memory device, analyzing the network performance data to generate a performance metric, generating an alarm if the value of the metric is outside a defined range, and associating the at least a portion of the buffered data with the alarm. The network performance data may be the availability of the computer network, the throughput of the computer network, and/or the speed of the computer network. The method may further include the step of analyzing the buffered data associated with the alarm to determine why the performance metric was outside the defined range. The method may further include storing the buffered data in a schema according to a common data model.

Another aspect of the invention is directed to a demonstrative device for marketing a system for monitoring the performance of a computer network. The device, in one embodiment, comprises first, second and third disks. On one side of the first disk is listed a plurality of computer communication applications. The second disk is disposed upon the first disk and rotates about an axis independently from the first disk. On one side of the second disk is listed a plurality of computer network communication methods. The third disk is disposed upon the second disk and rotates about an axis independently from the first disk and the second disk. On one side of the third disk is listed a plurality of computer network performance metrics.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Figure 1:
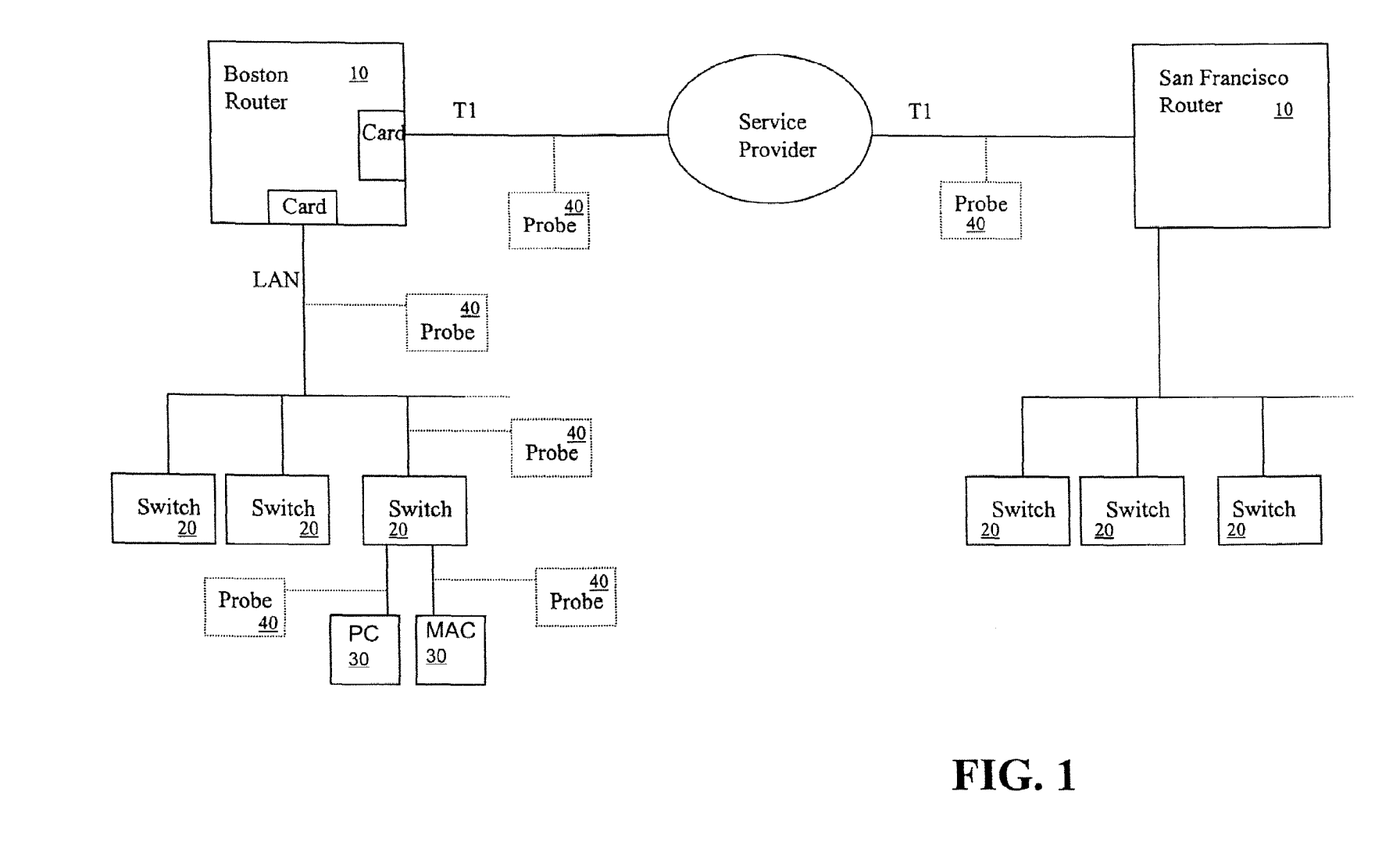
FIG. 1 is a block diagram depicting an embodiment of a real-time network monitoring system constructed in accordance with the principles of the present invention.

With reference to FIG. 1, a typical network includes a plurality of routers 10, which are often geographically separated, and connected to each other through a network backbone (e.g. a T1, T3 or other high-speed line). Each router 10 typically connects to a local area network (LAN), which includes a plurality of switches 20. Computers 30 or other network devices are connected together to form the LAN, which is itself connected to one or more switches 20. Communication among computers on different LANs occurs through the switches 20 and the routers 10. Probes 40 may be deployed at various network points. The probes are specifically designed, as described in more detail below, to monitor traffic on various types of networks. For example, a T3 probe monitors a T3 line, a T1 Probe monitors a T1 line, and so on for a LAN probe, a Token-Ring probe, and the like. The probes are strategically placed at various network interfaces to capture the data desired by a network manager.

As network traffic flows through the switches 20, probes 40, and routers 10, information related to the performance of the network is collected according to MIBs. Examples of MIBs include, but are not limited to, standard formats such as Remote Network Monitoring (RMON1 MIB), Remote Network Monitoring Version 2 (RMON II MIB), Mini-RMON, Universal Response Time (URT MIB), and MIB II. Additionally, some manufacturers create proprietary MIBs. The probes 40 capture network performance data as traffic flows through the probes. In addition, the probes 40 can receive information from the various switches 20, routers 10, and other network devices. The performance data received by the probes 40 from the various network resources is normalized (i.e., converted to a single format) as described in more detail below. This received data is transformed into a common data model (CDM) such that it appears to have been collected by a probe 40. In other words, data from separate and distinctly different sources (e.g., switches, routers, active agents, and probes) is stored in a unified format. Storing the data according to the CDM reduces the number of performance management tools required by a network manager to monitor the health and status of the network.

Figure 2:
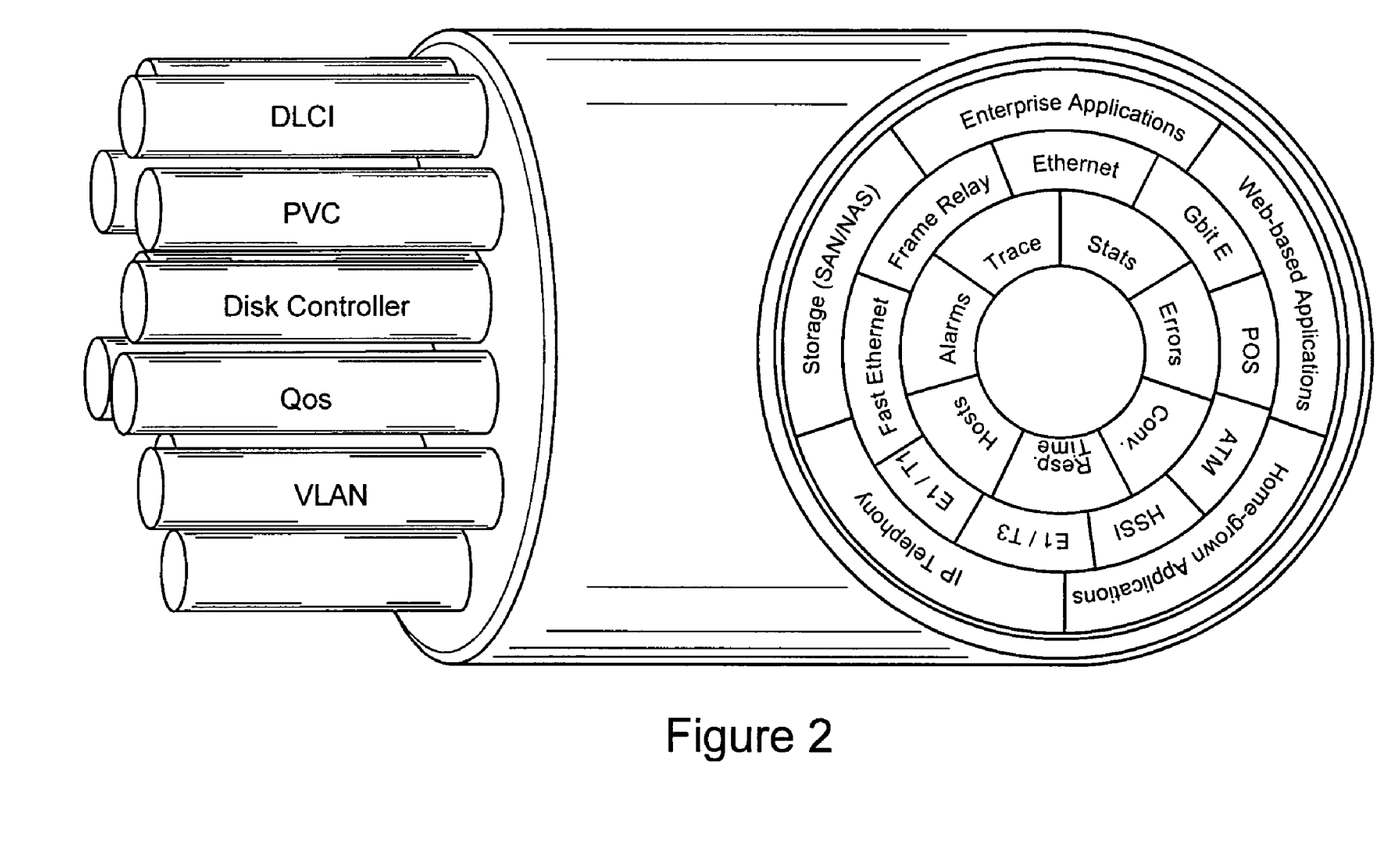
FIG. 2 is a graphical representation of an embodiment of a common data model.

Referring to FIG. 2, the CDM includes various statistical performance groups of data that are available from various data sources and network devices. Examples of the categories of data are shown in the inner ring of the figure in the pie-shaped wedges, and include information about hosts, alarms, traces (e.g., packet capture), statistics (e.g., volume utilization, and throughput), errors (e.g., Ethernet, Frame Relay, and ATM), conversations, and response time (e.g., network and individual applications). The middle ring includes a variety of protocols about which data can be collected and reported. Examples shown include E1/T1, E3/T3, Fast Ethernet, Frame Relay, Ethernet Gigabit Ethernet, Fibre Channel, POS, ATM, and HSSI. The outer ring describes the variety of applications about which data can be included, i.e., enterprise applications, Web-based applications, custom applications, IP telephony, TCP/IP, IP multicast, synthetic transactions, and storage (SAN/NAS). Thus, the CDM integrates information about a variety of applications, protocols, and categories of data. This data can be gathered at various types of interfaces, with examples conceptually shown as pipes on the left marked VLAN, QoS (Quality of Service), DLCI (frame relay), PVC (virtual circuits), disk controllers.

Various network devices resident on a network provide different levels of network performance information. These levels are classified within the CDM. For example, a MIB II compliant device provides information related to link statistics and errors. This is considered CDM level 1. Some routers and switches provide application statistics and host and conversation statistics for well known applications, such as file transfer, web, and email applications, in addition to the CDM level 1 information. This level of information is considered CDM level 2. A network device, such as a CISCO Network Access Module (NAM), may be able to provide application statistics and host and conversation statistics related to custom applications, such as a TCP based banking application, in addition to the CDM level 2 information. This information is considered CDM level 3 information. The probe captures CDM level 3 information and additional information related to response time. The probe can also perform packet capture. This level of information is considered CDM level 4 information. The normalization and integration of these various levels of CDM information is performed by the probe 40.

Figure 3:
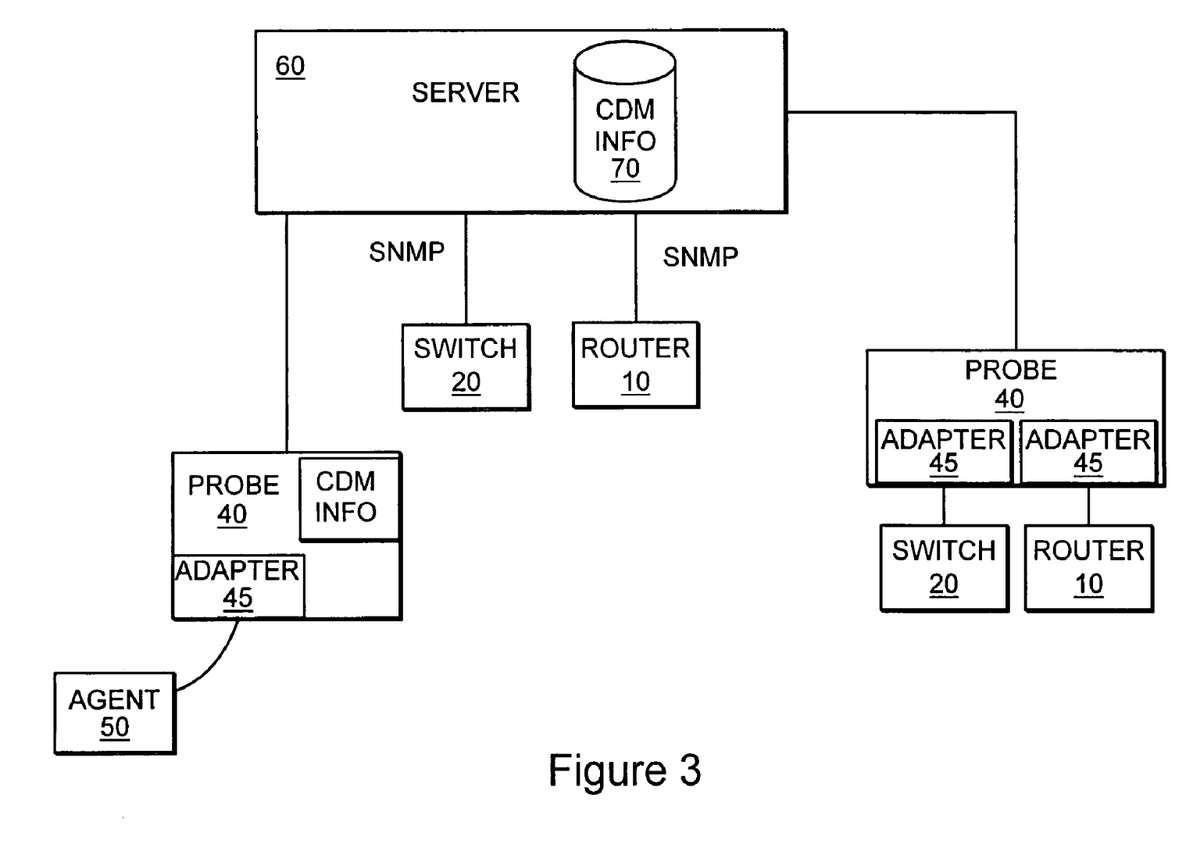
FIG. 3 is a block diagram depicting an embodiment of an active agent, probe, and server relationship constructed in accordance with the principle of the present invention.

With reference to FIG. 3, the probe 40, in addition to capturing network performance information, can also receive information from a variety of network devices and convert this received information into the CDM. In one embodiment, the probe 40 includes one or more CDM adapters 45. Each adapter 45 can be implemented in hardware or software, and is resident within the probe. Examples of CDM adapters include, but are not limited to, a NetFlow CDM adapter, an sFlow CDM adapter, a custom application CDM adapter, an active agent CDM adapter, and a Gigachannel adapter. The probe 40 is in communication with a network device such as a switch 20 via the adapter 45. A single adapter 45 may be in communication with a plurality of similar network devices.

In operation, a NetFlow CDM (45) adapter receives and normalizes NetFlow information from a router 10 or switch 20 to import the information to the CDM. More specifically, the probe 40 receives information via a UDP port from a device (e.g., a switch 20). The probe 40 maps the received conversation statistics to the conversations group of the CDM model. In addition, the probe 40 may derive additional information related to the other categories of the CDM from the received data. For example, the probe can total the received information in such a way as to fill in Host group statistics of the CDM. More specifically, if the probe receives information that a host A and host B had a conversation that resulted in 300 bytes of information being sent between them, the probe may also derive that host A sent 300 bytes of information and that host B received 300 bytes of information. This information about each specific host can be stored in the Host group statistics of the CDM. This is helpful because a typical NetFlow device only provides CDM level 2 information. By deriving additional information from the received data, a more complete picture of network performance is obtained.

Similarly, an sFlow CDM adapter receives and normalizes sFlow information from a switch 20 to conform the information to the CDM. More specifically, the probe 40 receives conversation performance information collected by the device via a UDP port. The probe 40 maps the received conversation statistics to the conversations group of the CDM model. In addition, the probe 40 may derive additional information related to the other categories of the CDM from the received data. For example, the probe can total the received information in such a way as to fill in Host group statistics of the CDM. Once again, this is helpful because a typical sFlow device only provides CDM level 2 information.

Each probe can include one or more active agents 50. Alternatively, the active agents 50 may be implemented as or in stand-alone devices. The active agents 50 can be hardware or software devices, and generate synthetic network transactions. Synthetic network transactions are described in more detail in U.S. Pat. No. 6,519,714 entitled "Evaluating Computer Resources," the entire contents of which are herein incorporated by reference. Generally, the active agents 50 are used to monitor the status of various network devices by exercising them on a regular and continuous basis and providing response time measurements for the application and network. For example, to monitor a web site for broken links, the active agent 50 can send commands to the website in order to simulate an actual end-user experience. In addition to exercising known applications such as web sites, the active agents 50 can be used to exercise custom applications as well. It should be understood, however, that in some embodiments, a probe 40 can execute synthetic network transactions without the use of an active agent 50.

In operation, the custom application CDM adapter and the active agent CDM adapter receive information from one or more active agents 50. The active agents 50 forward response time information to the probe 40. The probe 40 receives the response time information and, in response, sets filters within the probe 40 to watch for synthetic transaction traffic related to either a custom or well-known application on the network. The probe 40 maps the application response time statistics to the response to group of the CDM. Additionally, the probe 40 identifies traffic associated with the synthetic transaction in response to the filters set in the probe. This information obtained from the live network can be used to obtain other performance group statistics within the CDM.

In some embodiments, the CDM data resident in the probes is forwarded to a server 60 where it is combined with other data, which is either already in the CDM format or is transformed into the CDM format by the server. The data is stored (e.g., in a database schema 70) according to the CDM. Various software applications, which are part of the real-time network performance monitoring system, access the data and allow a network manager to view the performance of the network in various levels of detail.

Another aspect of the invention relates to aggregating the data collected from multiple interfaces on a probe to produce a single result. This aggregation capability may be useful, for example, when numerous communication channels are combined to increase bandwidth. A user may wish to view these numerous channels as being a single, high-speed communication channel. By using multiple interfaces on a probe to monitor the multiple communication channels, and then aggregating the data collected to form a single result, the user can be presented with performance statistics that treat the communication channels as a single combined channel. Other uses for aggregation include aggregating a primary link's CDM preformance statistics with those of its backup link when automatic fail over occurs, and aggregating links where load balancing is occurring.

Figure 4A:
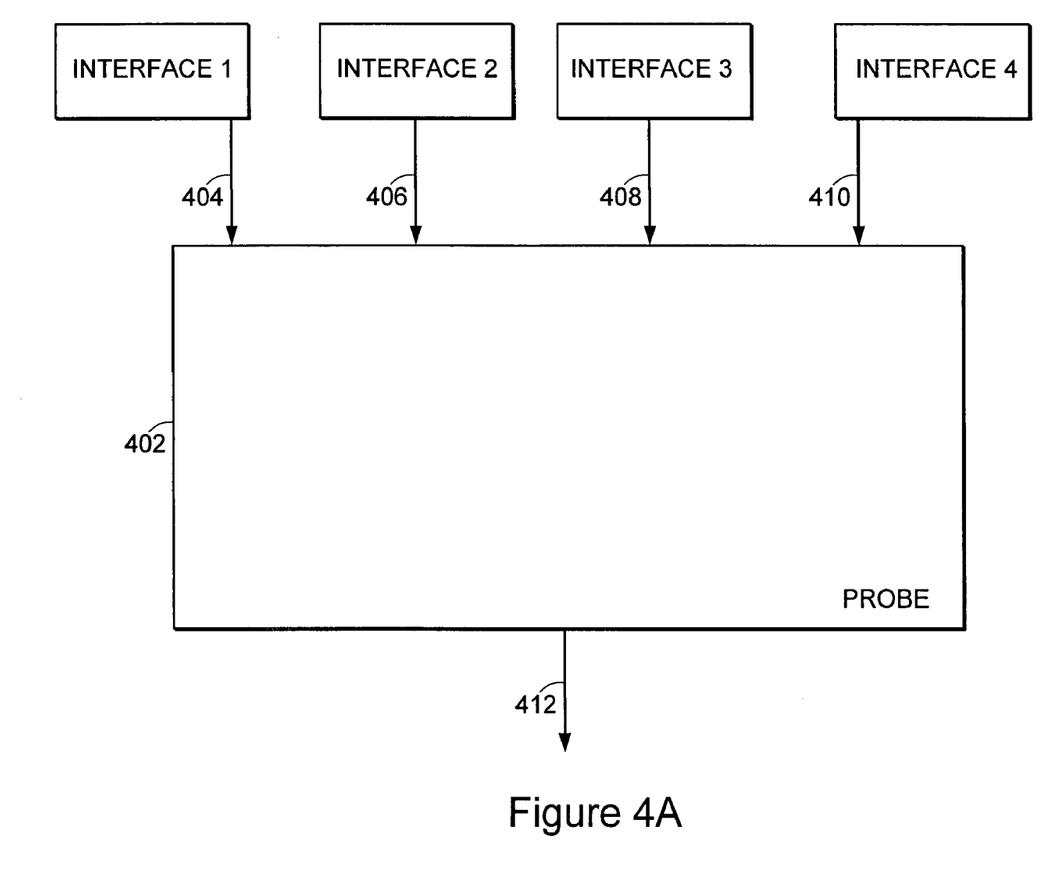
FIG. 4A is a block diagram representation depicting an embodiment of a plurality of interfaces and a special interface in accordance with the principle of the present invention.

Referring to FIG. 4A, a block diagram of such a system is described. The probe 402 includes interfaces 404, 406, 408, and 410, each of which can collect performance statistics in the manner described above (i.e., using adapters, active agents, etc.). Depending on the nature of the performance statistics collected by each of the interfaces, the data from each interface may be normalized into the CDM used by the probe 402. Once the data are normalized, they may be combined to present a single "special" interface 412.

The special interface 412 may present data from any combination of the interfaces 404, 406, 408, and 410. For example, the special interface may present performance statistics that are computed by aggregating data from input interfaces 406 and 408, or from all of the interfaces 404, 406, 408, and 410. A user of the probe 402 may view the data collected from any of interfaces 402, 404, 406, and 408, as well as the aggregated data presented on the special interface 412. In some embodiments, multiple aggregated special interfaces can be presented on a single probe, permitting a probe to present a combination of physical and logical (i.e., aggregated) interfaces. In some embodiments, the aggregated special interfaces may serve as inputs for further aggregation operations.

Because the data presented on the special interface 412 uses the CDM, there is no difference, from a user's perspective, between the special interface 412, which computes performance data by aggregating data from other interfaces, and interfaces that collect performance data, such as interfaces 404, 406, 408, and 410. Performance statistics from all of these interfaces can be used in the same manner, or viewed using the same set of tools.

The aggregation operations performed by the probe 402 depend on the statistics being aggregated. For example, for a statistic such as the total number of packets transferred across a link, the statistics for each of the interfaces can be summed. For a statistic representing the percentage utilization of the capacity of a channel, aggregation may be performed by computing a weighted average of the percent utilization of the channels, with weighting factors based on the total capacity of the channels. Typically, aggregation operation can be performed using summing, averages, weighted averages, and other similar operations well characterized in the art.

Figure 4B:
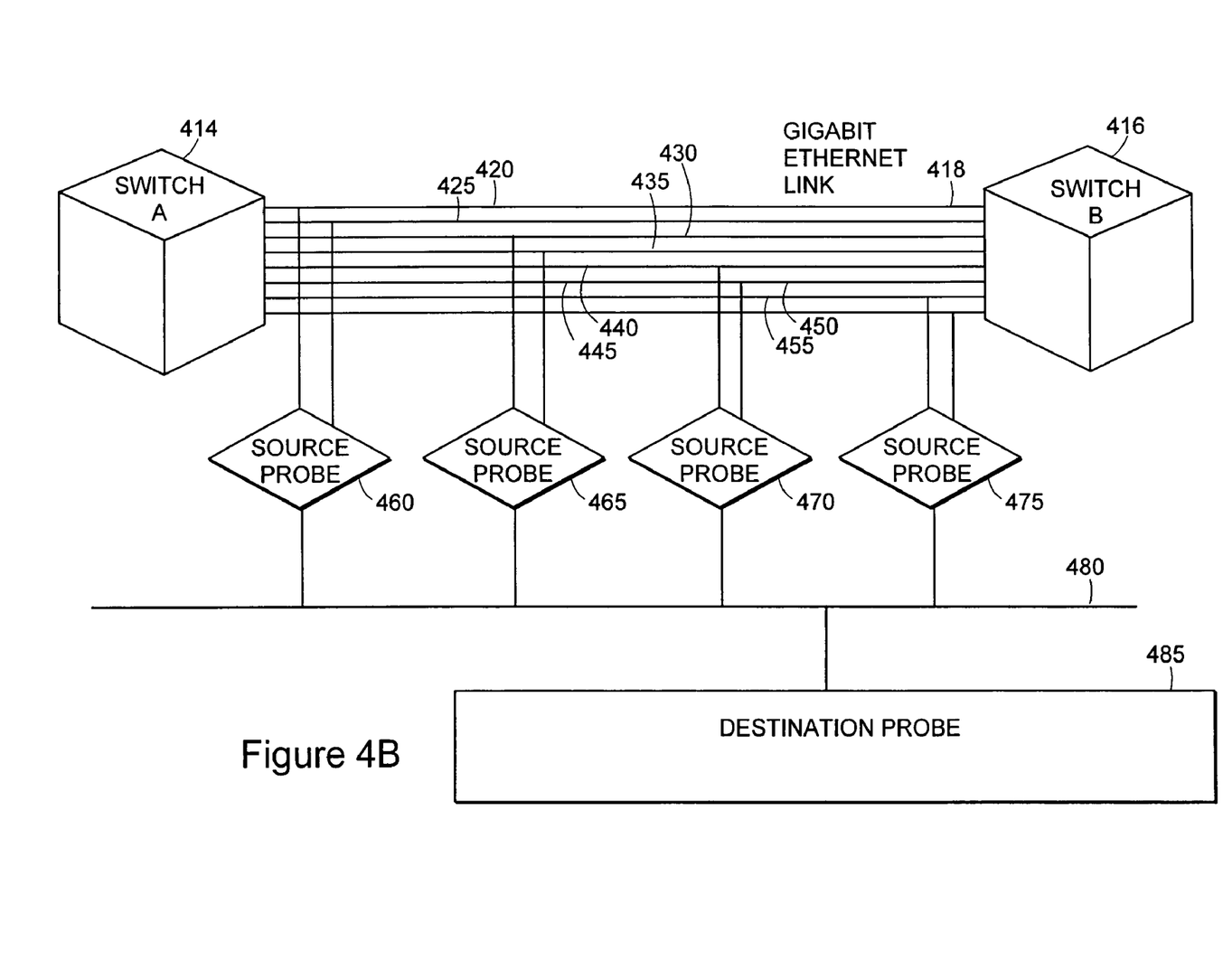
FIG. 4B is a block diagram representation depicting an embodiment of a plurality of source probes and a destination probe in accordance with the principle of the present invention.

In addition to performing aggregation operations using a single probe, such as probe 402, in some embodiments, multiple probes may be used to aggregate data collected from multiple inputs. FIG. 4B shows an example of aggregation, in which multiple probes, referred to herein as "source probes," are used to monitor and aggregate performance information across multiple physical and/or logical interfaces in a computer network.

In the example shown in FIG. 4B, numerous physical links are established between two switches in a computer network for the purpose of increasing the overall bandwidth available between the two switches. More particularly, two switches are linked by a total of eight physical links. These eight distinct physical links may be used as one logical link, with data from any particular application or source being sent across different physical links at any given time. Generally, the eight physical links are used to effectively increase the bandwidth between the two switches. While an individual probe can monitor and report in the performance of one physical link, in many cases it may be advantageous to monitor and report on the network performance at the logical link level, that is, across all eight of the physical links.

In FIG. 4B, two switches, switch A, 414, and switch B, 416, are linked by eight separate gigabit Ethernet links, thereby establishing one logical link 418, between the two switches 414 and 416. Physical link 1, 420, and physical link 2, 425 are connected to a first source probe, 460 through its interfaces. Through these interfaces, the first source probe, 460, monitors the performance of links 1 and 2, 420 and 425 respectively. Physical link 3, 430, and physical link 4, 435 are connected to a second source probe, 465, through its interfaces. Through these interfaces, the second source probe, 465, monitors the performance of links 3 and 4, 430 and 435 respectively. Physical link 5, 440, and physical link 6, 445 are connected to a third source probe, 470. The third source probe, 470, monitors the performance of links S and 6, 440 and 445 respectively. Physical link 7, 450, and physical link 8, 455 are connected to a fourth source probe, 475. The fourth source probe, 475, monitors the performance of links 7 and 8, 450 and 455 respectively.

Each source probe collects data on the links to which it is connected, and relays the information via a network 480 to a destination probe 485. In some instances, the information may be relayed using alternative technologies such as wireless data transfer, optical data transfer, as well as others.

Using the methods discussed above, with reference to FIG. 4A, the destination probe 485 aggregates the data received from the individual source probes 460, 465, 470, and 475 into a single special interface that provides an aggregate view of all the interfaces using CDM statistics. By providing an aggregate view of the data from the source probes, the special interface allows an administrator or management application to view network performance data as if it were monitoring data coming from a single network interface using the CDM.

Another aspect of the invention relates to a method for associating network performance data with an alarm condition, thereby allowing a user to analyze the network data being processed by the network when the alarm occurred. Generally, network administrators establish network performance metrics to determine whether a network is operating as anticipated. Such metrics may include, for example, acceptable boundaries for traffic volume, expected network response time, network availability, and expected application response time, among others. Network performance data is collected on a consistent basis, and compared to the performance metrics to determine if the performance data falls outside the previously defined performance metrics. An alarm condition exists when the performance of one or more elements of the network falls outside of one of the predefined metrics. The actual data that was being processed when the alarm occurred may be crucial to the investigation into the cause of the deviation.

One embodiment of the invention provides a method for associating network performance data to an alarm condition, thus allowing a network administrator or software application to analyze the data being processed by the network at the inception of the alarm condition. Administrators or other network management professionals determine the particular network performance measurements that are to be monitored for a given network or group of networks, and define an acceptable range for each measurement. Alternatively, thresholds for each measurement can be set automatically. In one embodiment, automatic thresholds are determined according to the methods described in co-pending U.S. patent application Ser. No. 09/409,843 entitled "Managing Computer Resources," the entire contents of which are herein incorporated by reference. In one embodiment, the network performance measurements relate to the throughput of the network by measuring the bytes or bits processed over a given time period. In another embodiment, network performance measurements relate to the availability of the network by constantly signaling various addresses on the network. In yet another embodiment, the network performance measurements relate to the response times of the network by measuring the elapsed time between a sent signal and its return.

The network performance measurements may be associated with a physical limitation of the network or components of the network, or with artificial limbs imposed by service level agreements, or in some embodiments, with both. Different metrics may be defined based on, for example, the time of day, the application(s) being used, or the communications protocol employed by the network. In some embodiments, the thresholds are determined by user input into a computer application. In some embodiments, the thresholds are determined automatically by software operating on a remote device, a probe at a network interface, or an application residing on the network.

In some embodiments, measurement thresholds are determined by the "width" of an alarm. As an example, a network may have a peak rate, over which a network cannot operate, a threshold rate, over which a network cannot operate over an extended period of time, and a normal operational rate. Initially, a network interface may determine that the sample data collected for an application, protocol, or device indicates it has exceeded the threshold measurement, but may not trigger an alarm. However, if the condition continues for some period of time—e.g., over a predetermined "width," an alarm may be triggered.

Other alarms may be based on the "height" of a particular measurement. For example, a network device or application may have an absolute throughput rate, over which the network's performance begins to degrade, or possibly cannot function. As data is sampled at a network interface, through a probe or other means, the current throughput may be compared to the absolute rate. An alarm may be triggered as the sampled rate approaches the absolute rate (e.g., at 85% of the absolute rate an alarm is triggered), or when the sampled rate actually meets or exceeds the absolute rate.

In some embodiments, alarms may be based on the response times as measured from applications that are configured to receive and respond to network transactions. For example, a probe may send a signal to a particular application once every reporting period. A reporting period may be any length of time configured for the particular application being monitored. Some applications may have reporting periods of seconds or minutes, while others may have reporting periods of milliseconds. As an illustration, a probe may send an Internet Control Message Protocol Packet Internet Groper ("ICMP Ping") to a particular application every 10 milliseconds. Under optimal circumstances, the application's responses to the ICMP Ping should return to the probe approximately every 10 milliseconds, with the elapsed time between a given send transmission and the corresponding receive transmission being the current response time. However, when an application is heavily utilized, for example, the responses may be delayed. In such cases, the probe may receive multiple response transactions in a particular response period. In some embodiments, an alarm may be generated where the number of responses received in a particular response period exceeds some threshold number.

In some embodiments, the alarms are based on proprietary technology. In some embodiments, the alarms may use standard Simple Network Management Protocol ("SNMP") to configure, send and receive the information used to measure the response times of applications or network devices.

Figure 5:
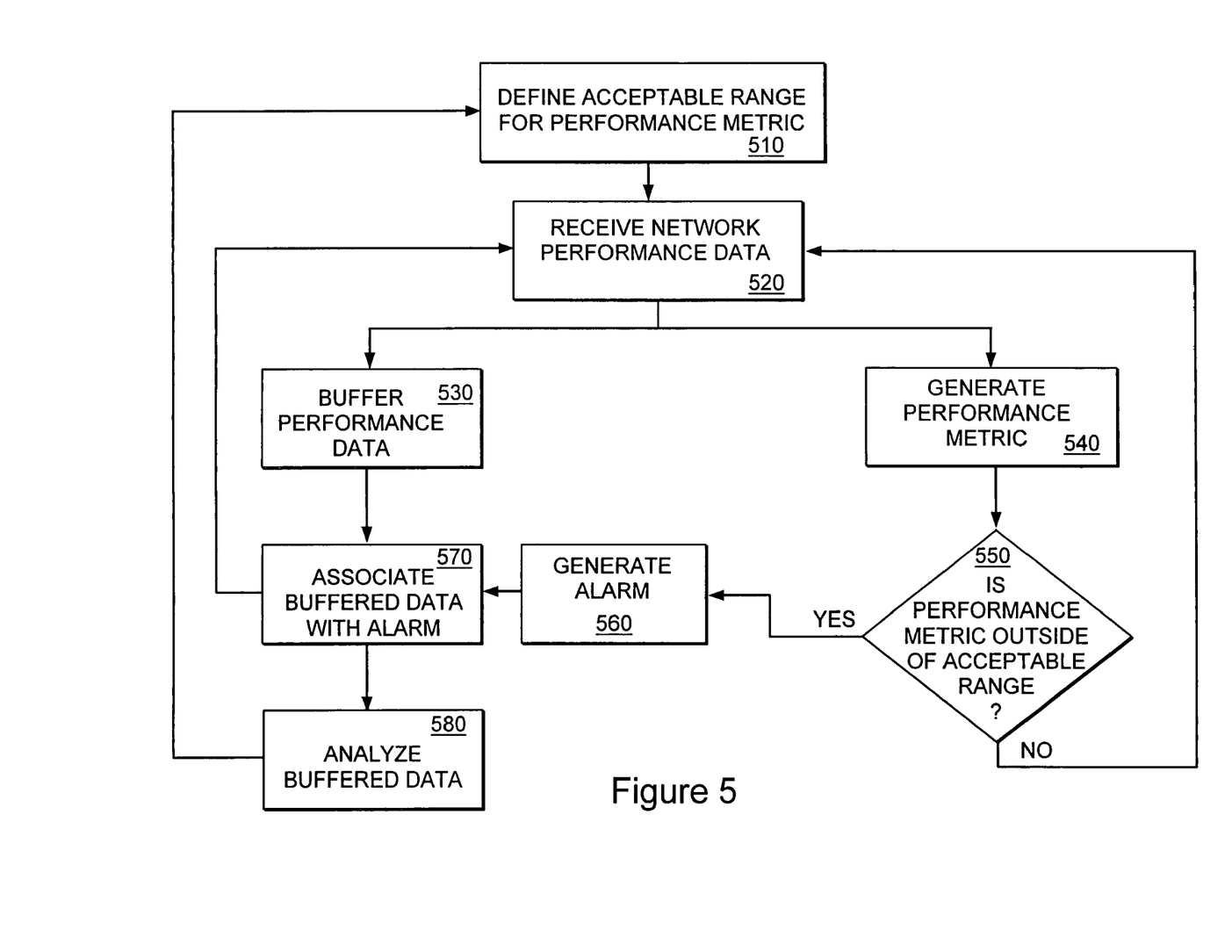
FIG. 5 is a flow chart depicting an embodiment of a method for associating network performance data with an alarm in a computer network, in accordance with the principle of the present invention.

With reference to FIG. 5, based on the information described above, network administrators define particular performance measurements for various aspects of the network and determine the acceptable ranges for the measurements. The acceptable ranges are then referred to as network performance metrics (STEP 510). On an ongoing basis network performance data is collected through network probes, CDM adapters, agents or other means and received at one or more locations (STEP 520). At least a portion of the network performance data is also buffered in a memory device (STEP 530). The amount of data that is stored in the buffer may be configured by a user, and may vary over time depending on factors such as time of day, overall network utilization, or other network performance measurements. In one embodiment, the data processed during the previous hour is buffered, and replaced on a first-in-first-out basis. The network performance data is also tagged with a timestamp. On an ongoing basis, a probe, CDM adapter, agent, or other monitoring device uses the network performance data to generate one or more current network performance metrics (STEP 540). The probe or other device compares one or more of the current performance metrics to the predefined network performance metrics to determine if the current performance metrics are within an acceptable range (STEP 550). If the current performance metrics are within an acceptable range, no action is taken. In some embodiments, the network performance data held in memory that is associated with the current metric is erased from the memory device.

However, if the current performance metric falls outside the predefined acceptable range, an alarm is generated (STEP 560). In response to the alarm, at least a portion of the buffered data is captured and associated with the alarm (STEP 570). The alarm and the associated data are made available for further analysis. In one embodiment, the probe signals a central software application and the alarm is displayed to a user of the application. The user can view the associated network performance data to aid in determining the root cause of the alarm (STEP 580). Automatically associating the data that resulted in an alarm with the resulting alarm allows a network administrator to view the data that caused the alarm and aids in determining why the alarm was generated. For example, if a response time alarm is generated the data in the buffer is associated with the alarm. This data can include the applications using the network prior to the alarm and the users of the network prior to the alarm and their respective response time statistics.

In one exemplary embodiment, a computer application may perform a filtering process. For example, multiple probes may be used to monitor network performance data and report alarm conditions to a computer application. A probe that detects an alarm condition may then transmit the alarm condition along with the buffered data associated with the alarm to the computer application. The computer application may then process the data, and determine if, based on its analysis of the data, further action is warranted.

Figure 6:
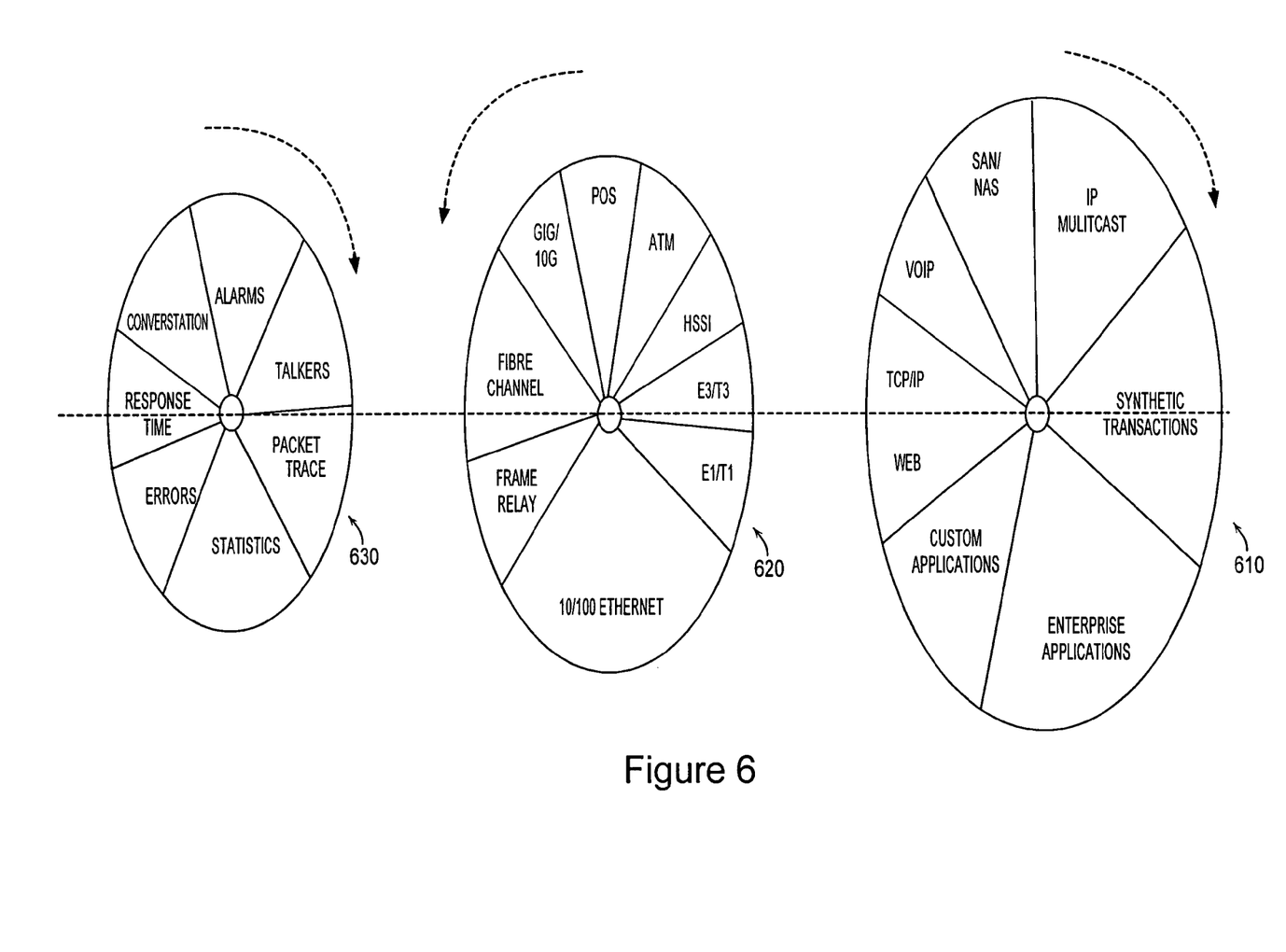
FIG. 6 schematically depicts an embodiment of a demonstrative device for marketing a system that monitors the performance of a computer network, in accordance with the principle of the present invention.

Referring to FIG. 6, another aspect of the invention relates to a demonstrative device for marketing the systems and methods described above. In one embodiment, the device may comprise three circular disks 610, 620, and 630. The first disk, 610, may be larger in diameter than the other two disks, 620 and 630. The second disk, 620, while smaller in diameter than the first disk, 610, is larger in diameter than the third disk, 630. The three disks are joined concentrically such the each disk can rotate either clockwise or counterclockwise independently of the other two disks. The stepped diameters ensure that the peripheries of all disks are exposed for viewing.

Printed around the periphery on the front of the first disk, 610, is a listing of one or more computer applications or services that may utilize a computer network for communications purposes. The applications or services may include Web-based applications, customer developed applications, applications using the TCP/IP protocol, synthetically generated network transactions, voice over IP, IP Multicast, as well as others.

Printed around the periphery on the front of the second disk, 620, is a listing of one or more types of networking infrastructures. The types of networking infrastructures included on the second disk may include frame relay, 10/100 Ethernet, E1/T1, E3/T3, Asynchronous Transmission Mode, GIG/10G Ethernet Fibre Channel, HSSI, POS, as well as others.

Printed around the front of the third disk, 630, is a listing of one or more performance metrics used to evaluate the performance of a computer network and/or computer applications using a computer network. The types of metrics included on the third disk may include errors, statistics, packet trace information, alarms, talkers, response time, conversations, as well as others.

By rotating each of the three rings to a particular position, the device represents one of a plurality of methods, environments, and applications that a system for monitoring network performance might need to be considered a fully effective system. As an example, if a potential user of such a system were shown the device, and the user was concerned about the number of concurrent conversations being handled by their voice over IP application running across E3/T3 lines, the three disks could be rotated in such a manner that the voice over IP text printed on the first disk 610, lined up with the E3/T3 text printed on the second disk, 620, which in turn lined up with the conversations text printed on the third disk, 630. In this manner, the three disks are can be aligned to demonstrate all of the combinations of applications, infrastructures, and metrics.

Having shown the preferred embodiments, one skilled in the art will realize that many variations are possible within the scope and spirit of the claimed invention. It is therefor the intention to limit the invention only by the scope of the claims.

What is claimed is:

1. A method of collecting, recording, and normalizing network performance data, the method comprising:

at least one probe receiving from an agent a first set of performance data collected by the agent in response to synthetic network transactions initiated by the agent, the synthetic network transactions being simulated application transactions, wherein the first set of performance data has at least a first level of network performance information in a set of levels of network performance information in a common data model, wherein the levels of network performance information in the common data model correspond to types of performance data, with the first level of network performance information corresponding to a first type of performance data, and wherein the first set of performance data is collected by the agent into a first management information base;

the at least one probe receiving a second set of performance data resulting from passively monitoring network traffic, the second set of performance data comprising a second type of performance data, wherein the second set of performance data has at least a second level of network performance information in the set of levels of network performance information in the common data model, the second level corresponding to the first type of performance data and another type of performance data.

wherein the second set of performance data is collected into a second management information base, and wherein the first management information base is different from the second management information base;

the at least one probe deriving a third set of performance data related to the common data model based on at least one of the first set of performance data and the second set of performance data, the third set of performance data having a third type of performance data;

the at least one probe normalizing at least the first set of performance data and the second set of performance data to create normalized network performance data having a single format; and the at least one probe storing, at a computer, the normalized network performance data in a schema according to the common data model.

2. The method of claim 1, wherein the first set of performance data comprises data related to a response time of a network resource.

3. The method of claim 1, wherein the first set of performance data comprises data related to availability of a network resource.

4. The method of claim 1, wherein the probe is resident at a network interface.

5. The method of claim 4, wherein the network interface is an interface between a computer and a network interface point.

6. The method of claim 5, wherein the network interface point is a switch.

7. The method of claim 5, wherein the network interface point is a router.

8. The method of claim 4, wherein the network interface is an interface between a service provider network and a local site network.

9. The method of claim 1, further comprising storing the normalized network performance data on a server.

10. A computer system for collecting, recording, and normalizing network performance data, the computer system comprising:

a memory;

a computer;

at least one agent connected to a computer network, the agent collecting a first set of performance data related to synthetic network transactions generated by the agent, the synthetic network transactions being simulated application transactions, wherein the first set of performance data has at least a first level of network performance information in a set of levels of network performance information in a common data model, wherein the levels of network performance information in the common data model correspond to types of performance data, with the first level of network performance information corresponding to a first type of performance data, and wherein the first set of performance data is collected into a first management information base;

at least one probe in communication with the agent, the probe comprising:
(i) at least one network interface card,
(ii) a monitor for passively monitoring the network traffic to thereby collect a second set of performance data comprising a second type of performance data, wherein the second set of performance data has at least a second level of network performance information in the set of levels of network performance information in the common data model, the second level of network performance information corresponding to the first type of performance data and another type of performance data, wherein the second set of performance data is collected into a second management information base, and wherein the first management information base is different than the second management information base, (iii) a deriver for deriving a third set of performance data related to the common data model based on at least one of the first set of performance data and the second set of performance data, the third set of performance data having a third type of performance data, and (iv) a normalizer for normalizing at least the first set of performance data and the second set of performance data to generate a set of normalized network performance data having a single format; and a server in communication with at least one network device, the server comprising a storage device for receiving and storing the set of normalized network performance data in a schema according to the common data model.

11. The computer system of claim 10, wherein the at least one network device is a probe.

12. The computer system of claim 11, wherein the probe further comprises an adapter for adapting data received from a plurality of network devices into a single format.

13. A method of actively generating and passively collecting data on a network, the method comprising:

an agent generating a synthetic network transaction for at least one probe, the synthetic network transaction being a simulated application transaction;

the at least one probe collecting, in response to the synthetic network transaction, a first set of performance data related to the synthetic network transaction, wherein the first set of performance data has at least a first level of network performance information in a set of levels of network performance information in a common data model, wherein the levels of network performance information in the common data model correspond to types of performance data, with the first level of network performance information corresponding to a first type of performance data, and wherein the first set of performance data is collected into a first management information base;

the at least one probe passively collecting a second set of performance data related to network transactions, the second set of performance data comprising a second type of performance data, wherein the second set of performance data has at least a second level of network performance information in the set of levels of network performance information in the common data model, the second level of network performance information corresponding to the first type of performance data and another type of performance data, wherein the second set of performance data is collected into a second management information base, and wherein the first management information base is different from the second management information base;

the at least one probe deriving a third set of performance data related to the common data model based on at least one of the first set of performance data and the second set of performance data, the third set of performance data having a third type of performance data;

the at least one probe normalizing at least the first set of performance data and the second set of performance data to generate a set of normalized network transaction data; and the at least one probe storing, at a computer, the set of normalized network transaction data according to common data model.

14. The method of claim 13 wherein collecting data related to the synthetic network transaction comprises collecting data related to a response time of a network resource.

15. The method of claim 14 wherein collecting data related to the synthetic network transaction further comprises collection data related to availability of a network resource.

16. The method of claim 13 wherein storing the normalized network transaction data comprises storing the normalized network transaction data on a server.

17. A network performance data collection device comprising:
a computer;
a memory;
a probe comprising at least one network interface card;
a monitor, connected to the probe, for passively monitoring network traffic received via the network interface card;
an extractor, connected to the probe, for extracting a first set of network performance data related to at least two different management information bases, wherein the first set of network performance data results from passively monitoring network traffic.

wherein the first set of network performance data has at least a first level of network performance information in a set of levels of network performance information in a common data model, wherein the levels of network performance information in the common data model correspond to types of performance data, with the first level of network performance information corresponding to a first type of performance data, and wherein the first set of network performance data is collected into a first management information base;

an agent for actively generating synthetic network transactions and providing a second set of network performance data comprising a second type of performance data,
wherein the second set of network performance data has at least a second level of network performance information in the set of levels of network performance information in the common data model, the second level of network performance information corresponding to the first type of performance data and another type of performance
a normalizer, connected to the probe, for creating normalized performance data from at least the first set of network performance data collected into a first management information base, and from the second set of network performance data collected into a second management information base,
wherein the first management information base is different from the second management information base, and
wherein the synthetic network transactions comprise simulated application transactions;
a deriver, connected to the probe, for deriving a third set of network performance data related to the common data model based on at least one of the first set of network performance data and the second set of network performance data, the third set of network performance data having a third type of performance data; and
a storage device, connected to the probe, for storing the normalized performance data in a schema according to the common data model.

18. A method of collecting data on a network, the method comprising:
capturing passive data by a probe in communication with the network, the passive data having a first type of performance data,
wherein the captured passive data have at least a first level of network performance information in a set of levels of network performance information in a common data model,
wherein the levels of network performance information in the common data model correspond to types of performance data, with the first level of the network performance information corresponding to the first type of performance data, and
wherein the passive data are collected into a first management information base;
receiving a first indicator from an agent in communication with the probe that a synthetic network transaction is beginning, the synthetic network transaction being a simulated application transaction;
receiving a second indicator from the agent that the synthetic network transaction is ending;
capturing data related to the synthetic network transaction from the agent,
wherein the data related to the synthetic network transaction are captured in response to receiving the first indicator until the receiving of the second indicator,
wherein the data related to the synthetic network transaction have a second type of performance data,
wherein the data related to the synthetic network transaction have at least a second level of network performance information in the set of levels of network performance information in the common data model, the second level of network performance information corresponding to the first type of performance data and another type of performance data,
wherein the data related to the synthetic network transaction are collected into a second management information base, and
wherein the first management information base is different from the second management information base;
deriving, at the probe, additional performance data related to the common data model based on at least one of the passive data and the data related to the synthetic network transaction, the additional performance data having a third type of performance data; and
storing, in a computer connected to the probe, the captured passive data, the data related to the synthetic network transaction, and the additional performance data in a schema according to the common data model.

19. The method of claim 18, further comprising normalizing the captured passive data and the captured data related to the synthetic network transaction, thereby generating a set of normalized network transaction data.

20. The method of claim 19, further comprising storing the normalized network transaction data.

21. The method of claim 20, wherein storing the normalized network transaction data comprises storing the normalized network transaction data on a server.

22. The method of claim 21, wherein storing the normalized network transaction data on a server further comprises storing the normalized network transaction data in a database schema according to the common data model.

23. A method of monitoring the performance of a computer network, the method comprising:
receiving a plurality of sets of network performance information at a probe from a plurality of sources, at least one of the plurality of sources comprising an agent,
wherein the sets of network performance information have a first type of performance information,
wherein the sets are stored in at least two different management information bases,
wherein the sets of network performance information have at least a first level of network performance information in a set of levels of network performance information in a common data model, and
wherein the levels of network performance information in the common data model correspond to types of performance information, with the first level of network performance information corresponding to the first type of performance information;
deriving, at the probe, additional network performance information related to the common data model based on the plurality of sets of network performance information,
wherein the additional network performance information has an additional type of performance information that is different from the first type of performance information, and
wherein the additional network performance information has at least an additional level of network performance information in the set of levels of network performance information in the common data model, the additional level of network performance information corresponding to the first type of performance information and the additional type of performance information;
normalizing, at the probe, the plurality of sets of network performance information and the additional network performance information to conform to the common data model used by the probe;

aggregating, at the probe, the normalized network performance information to produce a single result;

storing, in a computer connected to the probe, the aggregated normalized network performance information in a schema according to the common data model; and providing, at the probe, access to the aggregated normalized network performance information.

24. The method of claim 23, wherein providing access to the aggregated normalized network performance information comprises providing access to the aggregated normalized network performance information in the common data model.

25. A method of monitoring the performance of a computer network, the method comprising:

receiving a plurality of sets of network performance information at a plurality of source probes, each source probe receiving network performance information stored in a plurality of management information bases and from a plurality of sources, at least one of the plurality of sources comprising an agent, wherein the sets of network performance information have a first type of performance information, wherein the plurality of management information bases comprises at least two different management information bases, wherein the sets of network performance information has at least a first level in a set of levels of network performance information in a common data model, and wherein the levels of network performance information in the common data model correspond to types of performance information, with the first level corresponding to the first type of performance information deriving, at a selected probe, additional network performance information related to the common data model based on the plurality of sets of network performance information, wherein the additional network performance information has an additional type of performance information that is different from the first type of performance information, and wherein the additional network performance information has at least an additional level of network performance information in the set of levels of network performance information in the common data model, the additional level of network performance information corresponding to the first type of performance information and the additional type of performance information;

transmitting the plurality of sets of network performance information and the additional network performance information to a single destination probe;

incorporating the plurality of sets of network performance information and the additional network performance information received at the single destination probe into common data mode;

aggregating the transmitted information at the destination probe into a single data structure; and storing, in a computer connected to the destination probe, the aggregated transmitted information in a schema according to the common data model.

26. The method of claim 25, wherein storing the aggregated transmitted information comprises storing the single data structure on a server.

27. A computer system for collecting, recording, and normalizing network performance data, the system comprising:

a memory;

a computer;

a plurality of source probes comprising a plurality of network interface cards, connected to a computer network, the source probes collecting a plurality of sets of network performance data from a plurality of sources on a computer network, at least one of the plurality of sources comprising an agent, wherein the sets of network performance data have a first type of performance data and are collected into at least two different management information bases, wherein the sets of network performance data have at least a first level of network performance information in a set of levels of network performance information in a common data model, and wherein the levels of network performance information in the common data model correspond to types of performance data, with the first level of network performance information corresponding to the first type of performance data;

a destination probe in communication with the source probes, the destination probe comprising (i) a receiver for receiving the plurality of sets of network performance data from the source probes, (ii) a deriver for deriving additional network performance data based on the plurality of sets of network performance data, wherein the additional network performance data have an additional type of performance data that is different from the first type of performance data, and wherein the additional network performance data have at least an additional level of network performance information in the set of levels of network performance information in the common data model, the additional level of network performance information corresponding to the first type of performance data and the additional type of performance data;

(iii) an aggregation module for aggregating the plurality of sets of network performance data and the additional network performance data into aggregated network performance data having a single format; and a storage device for storing the aggregated network performance data according to the common data model.

28. The network performance data collection device of claim 17, wherein the agent extracts the second set of network performance data.

29. The method of claim 23, wherein aggregating the normalized network performance information comprises performing at least one computation using the normalized network performance information.

30. The method of claim 25, wherein aggregating the transmitted information comprises performing at least one computation using the transmitted information.

31. The system of claim 27, wherein the aggregation module performs at least one computation using the plurality of sets of network performance data and the additional network performance data.

* * * * *

UNITED STATES PATENT AND TRADEMARK OFFICE
CERTIFICATE OF CORRECTION

| | | Page 1 of 1 |
|---|---|---|
| PATENT NO. | : 7,711,751 B2 | |
| APPLICATION NO. | : 10/462220 | |
| DATED | : May 4, 2010 | |
| INVENTOR(S) | : Bruce Kelley et al. | |

It is certified that error appears in the above-identified patent and that said Letters Patent is hereby corrected as shown below:

Column 15, line 10, add "data" after --performance--.

Column 17, line 56, "common data mode" should read --the common data model--.

Signed and Sealed this

Eighteenth Day of January, 2011

David J. Kappos
*Director of the United States Patent and Trademark Office*